(12) United States Patent
Ogura

(10) Patent No.: US 6,266,722 B1
(45) Date of Patent: Jul. 24, 2001

(54) MULTI-VALUE LOGIC DEVICE, BUS SYSTEM OF MULTI-VALUE LOGIC DEVICES CONNECTED WITH SHARED BUS, AND NETWORK SYSTEM OF INFORMATION PROCESSORS LOADED WITH MULTI-VALUE LOGIC DEVICES AND CONNECTED WITH SHARED NETWORK

(75) Inventor: Shiro Ogura, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/277,847

(22) Filed: Mar. 29, 1999

(30) Foreign Application Priority Data

Jul. 31, 1998 (JP) .................................................. 10-217491

(51) Int. Cl.$^7$ .................................................. G06F 13/00
(52) U.S. Cl. .................................. 710/100; 710/1; 710/69
(58) Field of Search .................................. 710/1, 69, 100

(56) References Cited

U.S. PATENT DOCUMENTS

| | | | |
|---|---|---|---|
| 4,140,920 | * | 2/1979 | Dao et al. ............................. 307/207 |
| 5,287,291 | * | 2/1994 | Cuffe et al. .......................... 364/507 |
| 5,771,394 | * | 6/1998 | Asghar et al. ............................ 710/7 |

FOREIGN PATENT DOCUMENTS

| | | |
|---|---|---|
| 63-20931 | 1/1988 | (JP) . |
| 64-14631 | 1/1989 | (JP) . |

* cited by examiner

Primary Examiner—Xuan M. Thai
(74) Attorney, Agent, or Firm—Leydig, Voit & Mayer, Ltd.

(57) ABSTRACT

A multi-value logic device in which a unique bus level is allocated beforehand to each binary logic signal outputted by a function of the multi-value logic device. Upon receipt of the binary logic signal via a bus level selection circuit, a driver converts the binary logic signal to an analog signal with a voltage having an amplitude of $e \cdot 2^{n-1}$, in which n is the bus level of the binary logic signal and e is a reference voltage. When a plurality of binary logic signals are simultaneously inputted, the driver superimposes analog signals in accordance with the bus level of each binary logic signal to generate a multi-value logic signal, so that multiplex communication is realized. A receiver performs an operation reverse to the operation of the driver, and encodes a multi-value logic signal received via a bus to convert the signal to a binary logic signal and transmit the signal to each function. In this manner, the multi-value logic device suppresses an increase in the number of bus signal conductors, and enhances throughput by realizing multiplex communication.

14 Claims, 11 Drawing Sheets

ONE-TO-ONE DEVICE × n-SET SIMULTANEOUS COMMUNICATION

ONE-TO-n DEVICE SIMULTANEOUS COMMUNICATION

ONE-TO-ONE DEVICE BI-DIRECTIONAL SIMULTANEOUS COMMUNICATION

ONE-TO-ONE DEVICE × n-SET MULTI-VALUED LOGIC COMMUNICATION

ONE-TO-ONE DEVICE MULTI-VALUED LOGIC COMMUNICATION

MULTI-VALUE LOGIC DEVICE, BUS SYSTEM OF MULTI-VALUE LOGIC DEVICES CONNECTED WITH SHARED BUS, AND NETWORK SYSTEM OF INFORMATION PROCESSORS LOADED WITH MULTI-VALUE LOGIC DEVICES AND CONNECTED WITH SHARED NETWORK

BACKGROUND OF THE INVENTION (i) Field of the Invention

The present invention relates to a multi-value logic device for transmitting or receiving multi-value logic signals, a bus system in which multi-value logic devices are connected with a shared bus, and a network system in which information processors loaded with multi-value logic devices are connected with a shared network, and especially to suppression of enlargement of equipment with a multi-value logic device mounted thereon and enhancement of throughput.

(ii) Description of the Related Art

A computer or other information processor is loaded with semiconductor integrated circuits or other devices, and the devices usually perform data transfer via a shared bus. Recently, with the development of semiconductor technology, an on-device circuit has been highly integrated, memory capacity has been enlarged, and the processing capability of a processor or the like has been improved. As a result, the data amount transferred between the devices is progressively increasing. In general, since the data transferred via the bus is binary, the number of bus signal conductors (bus width) is also progressively increasing to handle the increased data amount. It is natural nowadays to set the bus width to 32 bits or 64 bits, and even a bus width of 128 bits is going to be placed on the market. Therefore, with the increase of bus width and, accordingly, with the increase of the number of pins or wiring, the enlargement of a device, a board loaded with the device and further an equipment itself loaded with the board, the deterioration of reliability due to complicated wiring, or the cost increase, has caused problems.

To solve the problems, there is proposed a technique in which a plurality of bus masters can be simultaneously connected. In a bus system using a shared bus, a bus master which exclusively uses the bus shared by a plurality of devices is usually selected, and only the bus master can be used for a certain time. In this case, by recognizing the presence of a plurality of subordinate bus masters in predetermined conditions, simultaneous/parallel data transfer is realized. Thereby, data throughput is prevented from decreasing without increasing the number of signal conductors.

However, in the technique in which the transfer of binary data is a prerequisite, the bus width cannot be reduced. To solve this problem, there is proposed a system using a multi-value logic bus in which binary data is converted into analog signals to prepare a multi-value logic signal and perform data transfer, so that the number of signal conductors can be reduced and wiring is facilitated. For example, a method is disclosed in Japanese Patent Laid-Open Publication No. Hei 1-14631, in which a device output section is provided with a D/A converter while an input section is provided with A/D converter, and data is transferred with an analog signal having a multi-value level on a bus. The operation of multi-value logic bus system in an analog system will be described in detail with reference to a system structure shown in FIG. 11.

In FIG. 11, each of devices A, B, C, D connected via a bus uses a plurality of bus levels 1, 2, 3 in a fixed manner. For example, when binary data is 1 (high level), the data is converted to a voltage of 1V at bus level 1, the data is converted to a voltage of 2V at bus level 2, and the data is converted to a voltage of 4V at bus level 3. If 0V is included, data can be represented by eight voltage amplitudes for each signal conductor. Therefore, the system can reduce the number of signal conductors compared with the binarizing system in which two voltage levels are used for each signal conductor. When data of 15 bits is transferred using the aforementioned bus levels 1 to 3, different from the binarizing system in which 15 data signal conductors are necessary, data transfer can be performed only with five data signal conductors in the analog multi-value system. As a result, since the number of signal conductors can be reduced using a multi-value logic signal, the aforementioned problems such as the increase of the bus width, the increase in the number of pins and wiring, and the enlargement of the device, the bus system using the device, and the like can be solved.

In the bus system in which conventional multi-value logic devices are connected, however, since the devices use the same bus levels in the system, communication cannot be executed simultaneously with other communication to avoid mutual interference as long as the shared bus is used. Specifically, in the conventional art, although the number of signal conductors can be decreased and the size of the board or the like can be reduced, communication can be simultaneously executed only between a pair of devices. Therefore, multiplex communication by a plurality of bus masters is impossible, so that throughput cannot be enhanced.

SUMMARY OF THE INVENTION

The present invention has been developed in order to solve the problems described above, and an object thereof is to provide a bus system and a network system in which by realizing multiplex communication via a shared bus between multi-value logic devices, throughput can be enhanced.

Another object is to provide a multi-value logic device which suppresses an increase in the number of bus signal conductors and realizes multiplex communication in a bus system.

To attain these and other objects, the present invention provides a multi-value logic device which comprises at least one function for outputting a binary logic signal via a binary logic signal output line; and transmission control means having a data input signal conductor corresponding to each binary logic signal output line and, when a bus level uniquely allocated to the data input signal conductor to which the binary logic signal from the function is inputted is n (n being a natural number) and a reference voltage at the time of signal output to the outside is e, converting the binary logic signal to an analog signal with a voltage of $e \cdot 2^{n-1}$ to transmit the signal to the outside. When a plurality of binary logic signals are simultaneously inputted, the transmission control means superimposes converted analog signals to transmit data as a multi-value logic signal.

The device also has an output signal selection circuit which can dynamically establish a correspondence between the binary logic signal output line of the function and the data input signal conductor of the transmission control means.

Moreover, at least one function has a plurality of binary logic signal output lines.

Furthermore, the transmission control means has constant-current sources for driving different currents corresponding to the data input signal conductors.

According to another aspect, the present invention provides a multi-value logic device which comprises at least one function for receiving a binary logic signal via a binary logic signal input line; and reception control means having a data output signal conductor corresponding to the binary logic signal input line, a bus level n (n being a natural number) being uniquely allocated to each data output signal conductor, and converting an analog multi-value logic signal transmitted from the outside to at least one binary logic signal to transmit the converted binary logic signal to the function via the data output signal conductor. When a reference voltage at the time of receiving the multi-value logic signal is e, the reception control means decodes a superimposed voltage of $e \cdot 2^{n-1}$ constituting the received multi-value logic signal to distinguish a bus level as a factor for generation of the voltage, and transmits the binary logic signal via the data output signal conductor corresponding to the distinguished bus level.

The device also has an input signal selection circuit which can dynamically establish a correspondence between the binary logic signal input line of the function and the data output signal conductor of the reception control means.

Moreover, at least one function has a plurality of binary logic signal input lines.

According to another aspect, the present invention provides a multi-value logic device which comprises at least one function having at least one binary logic signal conductor constituted of a binary logic signal output line for outputting a binary logic signal and a binary logic signal input line for receiving a binary logic signal and having a unique bus level allocated to each binary logic signal conductor; transmission control means having a data input signal conductor corresponding to each binary logic signal output line and, when the bus level of the binary logic signal output line via which the binary logic signal is outputted is n (n being a natural number) and a reference voltage at the time of signal output to the outside is $e_1$, converting the binary logic signal to an analog signal with a voltage of $e_1 \cdot 2^{n-1}$ to transmit the signal to the outside; and reception control means having a data output signal conductor corresponding to each binary logic signal input line, and converting an analog multi-value logic signal transmitted from the outside to at least one binary logic signal to transmit the converted binary logic signal to the function via the data output signal conductor. When a plurality of binary logic signals are simultaneously inputted, the transmission control means superimposes the converted analog signals to transmit data as the multi-value logic signal. When a reference voltage at the time of receiving the multi-value logic signal is $e_2$, the reception control means decodes the superimposed voltage of $e_2 \cdot 2^{n-1}$ constituting the received multi-value logic signal to distinguish a bus level as a factor for generation of the voltage, and transmits the binary logic signal to the binary logic signal input line of the function corresponding to the distinguished bus level.

The device further has an input/output signal selection circuit which can dynamically establish a correspondence between the binary logic signal output line of the function and the data input signal conductor of the transmission control means and between the binary logic signal input line of the function and the data output signal conductor of the reception control means.

A bus system according to the present invention has a plurality of multi-value logic devices of the present invention, and a shared bus for connecting the multi-value logic devices. By allocating to each binary logic signal conductor of a set of multi-value logic devices for use in data communication a bus level which does not overlap that of the binary logic signal conductor for use in another data communication, multiplex communication between the multi-value logic devices is realized.

Moreover, at least one of the multi-value logic devices has a plurality of functions, and simultaneous/parallel data communication can be performed between the functions and the function of the other multi-value logic devices.

In another aspect of the present invention, at least one set of multi-value logic devices performing data communication have a plurality of functions, and simultaneous/parallel data communication can be performed among the plurality of functions.

Furthermore, at least one set of multi-value logic devices performing data communication have functions each of which has a plurality of binary logic signal conductors, and data communication can be performed between the functions simultaneously using the plurality of binary logic signal conductors.

A network system according to the present invention has a plurality of information processors, and a shared network for connecting the information processors. Each of the information processor is loaded with the multi-value logic device of the present invention. By allocating to each binary logic signal conductor of a set of multi-value logic devices for use in data communication a bus level which does not overlap that of the binary logic signal conductor for use in another data communication, multiplex communication between the information processors is realized.

According to the present invention, the binary logic signals outputted from the function are converted to analog signals with a voltage which is obtained based on the uniquely allocated bus level to output a multi-value logic signal. The bus width can thereby be reduced. Furthermore, even when a plurality of signals are simultaneously outputted from the function, the analog signals generated based on the binary logic signals have different amplitudes. Even when the analog signals are superimposed, the signal superimposition relationship can be distinguished on the reception side. Therefore, since multiplex communication can be realized, the throughput of data transmission can be enhanced.

Moreover, since a correspondence can be dynamically established between the signal conductors on the side of the function and the signal conductors on the side of the transmission/reception control means, the correspondence of the signals can be changed not only at the time of system start but also during system operation.

Additionally, when the function has a plurality of signal conductors for outputting binary logic signals, by simultaneously transmitting output to the other function via each signal conductor, the throughput of data transmission can further be enhanced.

Moreover, by connecting via the shared bus the multi-value logic devices for realizing the aforementioned multiplex communication, simultaneous communication can be realized between one-to-one, one-to-multiple, or multiple-to-multiple multi-value logic devices. Therefore, the throughput of data transfer can be enhanced without increasing the number of bus signal conductors or the like.

Furthermore, by connecting via the shared network the information processors loaded with the multi-value logic devices for realizing the aforementioned multiplex communication, simultaneous communication can be realized between one-to-one, one-to-multiple, or multiple-tomultiple information processors. Therefore, the throughput of data transfer can be enhanced without increasing the number of network signal conductors or the like.

DETAILED DESCRIPTION OF THE PREFERRED EMBODIMENTS

Preferred embodiments of the present invention will now be described with reference to the drawings.

FIRST EMBODIMENT

Figure 1:
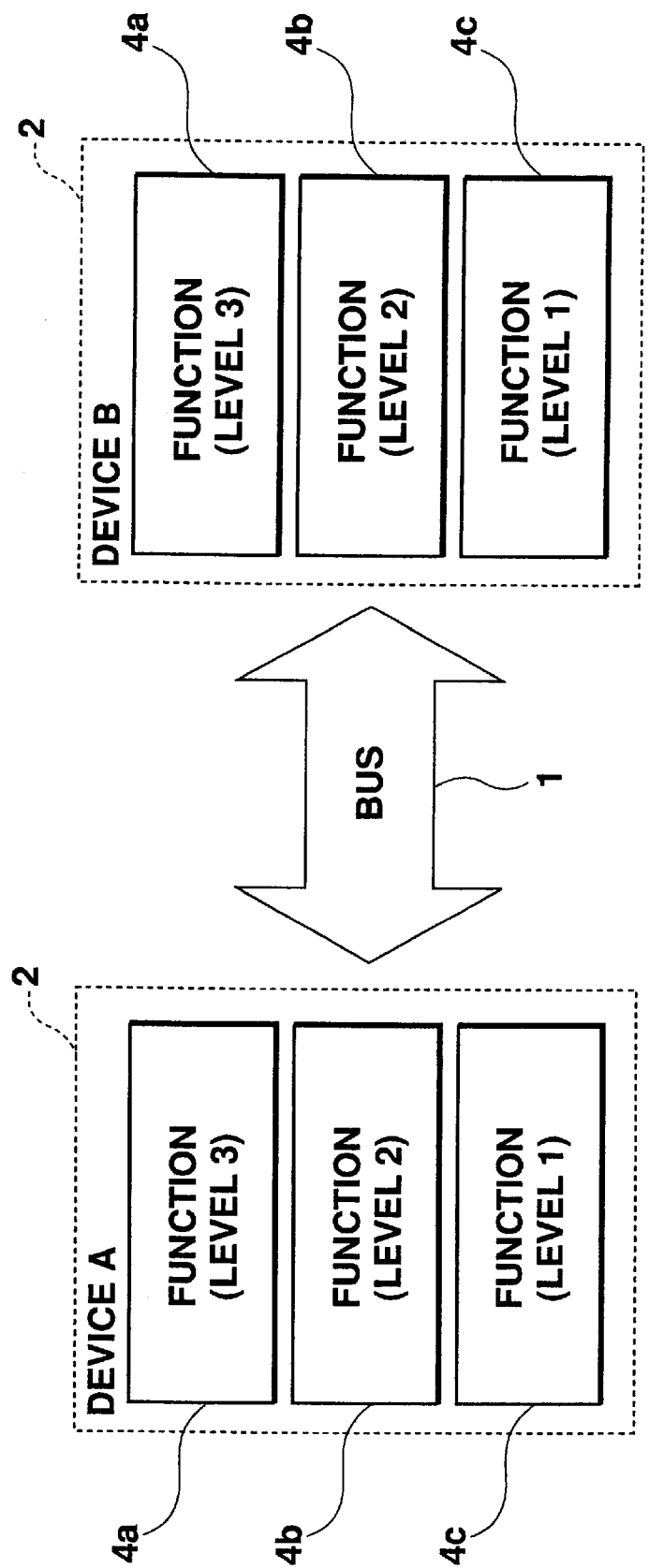
FIG. 1 is a diagram showing the overall structure of a bus system according to a first embodiment of the present invention.

FIG. 1 is a diagram showing the overall structure of a bus system according to the first embodiment of the present invention. The bus system is usually provided in an information processor such as a computer. FIG. 1 shows a pair of devices 2 connected via a bus 1. The device 2 is a multi-value logic device which converts binary logic signals outputted from functions 4a, 4b, 4c mounted therein to an analog multi-value logic signal to perform data transfer.

Figure 2:
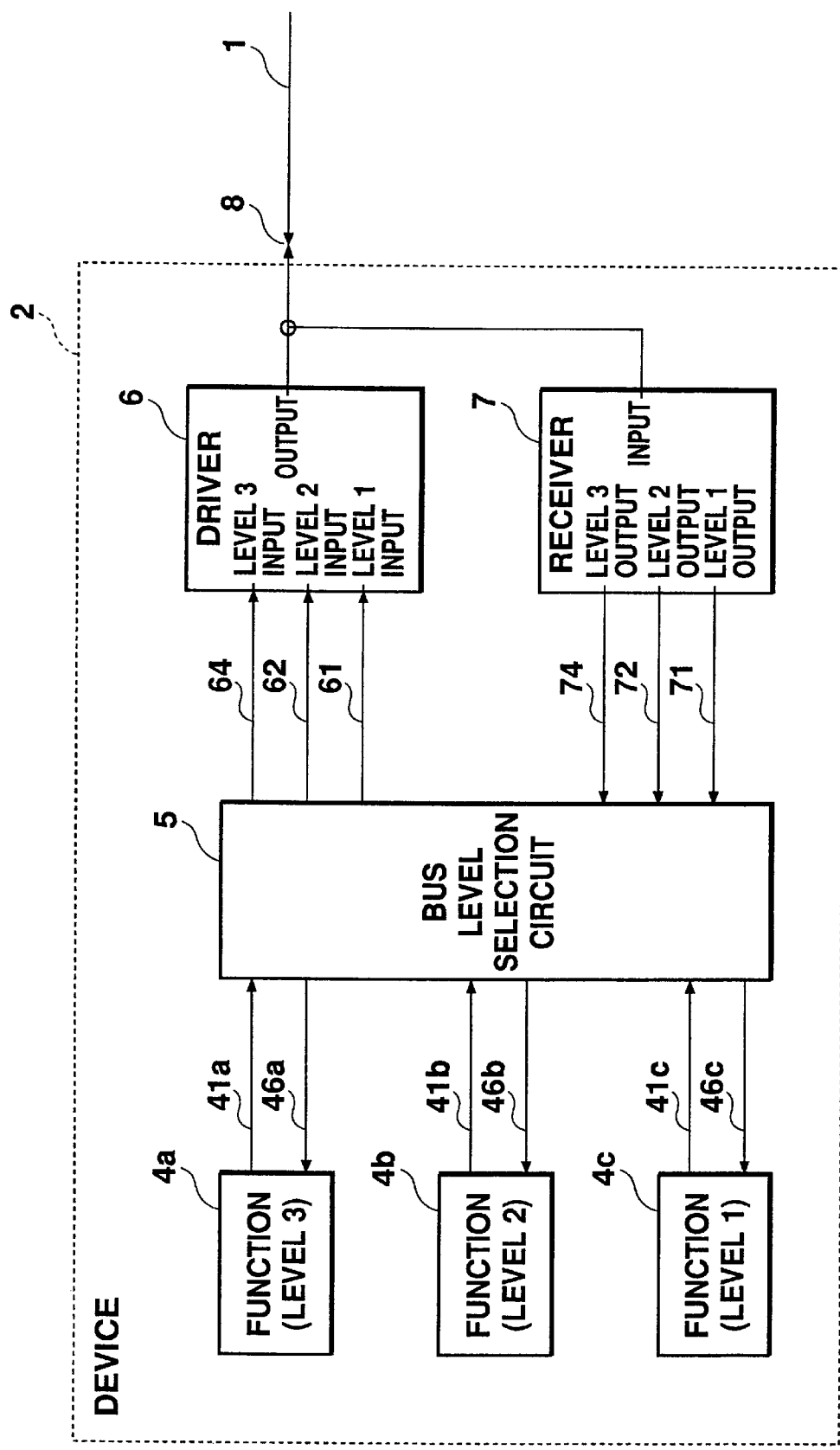
FIG. 2 is a block diagram showing the inside of a device of the first embodiment.

FIG. 2 is a block diagram showing the inside of the device in the first embodiment. The device 2 has the functions 4a, 4b, 4c, a bus level selection circuit 5, a driver 6 and a receiver 7. The device 2 is connected to the bus 1 shared by the devices via an input/output pin 8.

The functions 4a, 4b, 4c realize, for example, a SCSI .Th10 controller, a network controller, a cache controller and other functions of the device 2. In the embodiment, the device 2 has a plurality of functions. The functions 4a, 4b, 4c transmit signals 41a, 41b, 41c to the bus level selection circuit 5 via binary logic signal output lines. Moreover, the functions receive signals 46a, 46b, 46c from the bus level selection circuit 5 via binary logic signal input lines. In the embodiment, each of the functions 4a, 4b, 4c has one binary logic signal conductor constituted of the binary logic signal output line and the binary logic signal input line, but may have a plurality of binary logic signal conductors as described later in another embodiment.

The bus level selection circuit 5 serves as an output signal selection circuit which establishes a correspondence between the output signals 41a, 41b, 41c of the functions 4a, 4b, 4c and the input signals 64, 62, 61 of the driver 6 to perform routing between the functions and the driver. The bus level selection circuit 5 also serves as an input signal selection circuit which establishes a correspondence between output signals 74, 72, 71 of the receiver 7 and the input signals 46a, 46b, 46c of the functions 4a, 4b, 4c to perform routing between the functions and the receiver. The routing function of the bus level selection circuit 5 can be realized by programming. The correspondence of the signals is set at the time of system start, and can further be dynamically changed even during system operation. In the embodiment shown in FIG. 2, the bus level selection circuit 5 establishes a correspondence between the signal 41a from the function 4a using a bus level (hereinafter also referred to just as level) 3 and the input signal 64 of the driver 6 of the same level 3. Similarly, a correspondence is established between the signal 41b from the function 4b using level 2 and the input signal 62 of the driver 6 of the same level 2, and between the signal 41c from the function 4c using level 1 and the input signal 61 of the driver 6 of the same level 1. The bus level selection circuit 5 also establishes a correspondence between the output signal 74 from the receiver 7 using level 3 and the input signal 46a of the function 4a of the same level 3. Similarly, a correspondence is established between the output signal 72 from the receiver 7 of level 2 and the input signal 46b of the function 4b of the same level 2 and between the output signal 71 from the receiver 7 of level 1 and the input signal 46c of the function 4c of the same level 1, respectively. Additionally, if a fixed correspondence is established between the binary logic signal output line of each function 4a, 4b, 4c and the data input signal conductor of the driver 6, or between the binary logic signal input line of each function 4a, 4b, 4c and the data output signal conductor of the receiver 7, the bus level selection circuit 5 is unnecessary because routing is unnecessary.

The driver 6 has the same number of data input signal conductors as the number of binary logic signal output lines from the functions 4a, 4b, 4c as aforementioned, and a correspondence is established by the bus level selection circuit 5. The driver 6 also serves as transmission control means which can be realized by providing a D/A converter, to encode the input signals 61, 62, 64 from the bus level selection circuit 5 and emit an analog signal.

The receiver 7 has the same number of data output signal conductors as the number of binary logic signal input lines from the functions 4a, 4b, 4c as aforementioned, and a correspondence is established by the bus level selection circuit 5. The receiver 7 also serves as reception control means which can be realized by providing an A/D converter, to decode the analog signal transmitted via the bus 1 into the digital output signals 71, 72, 74 of the levels.

Figure 3:
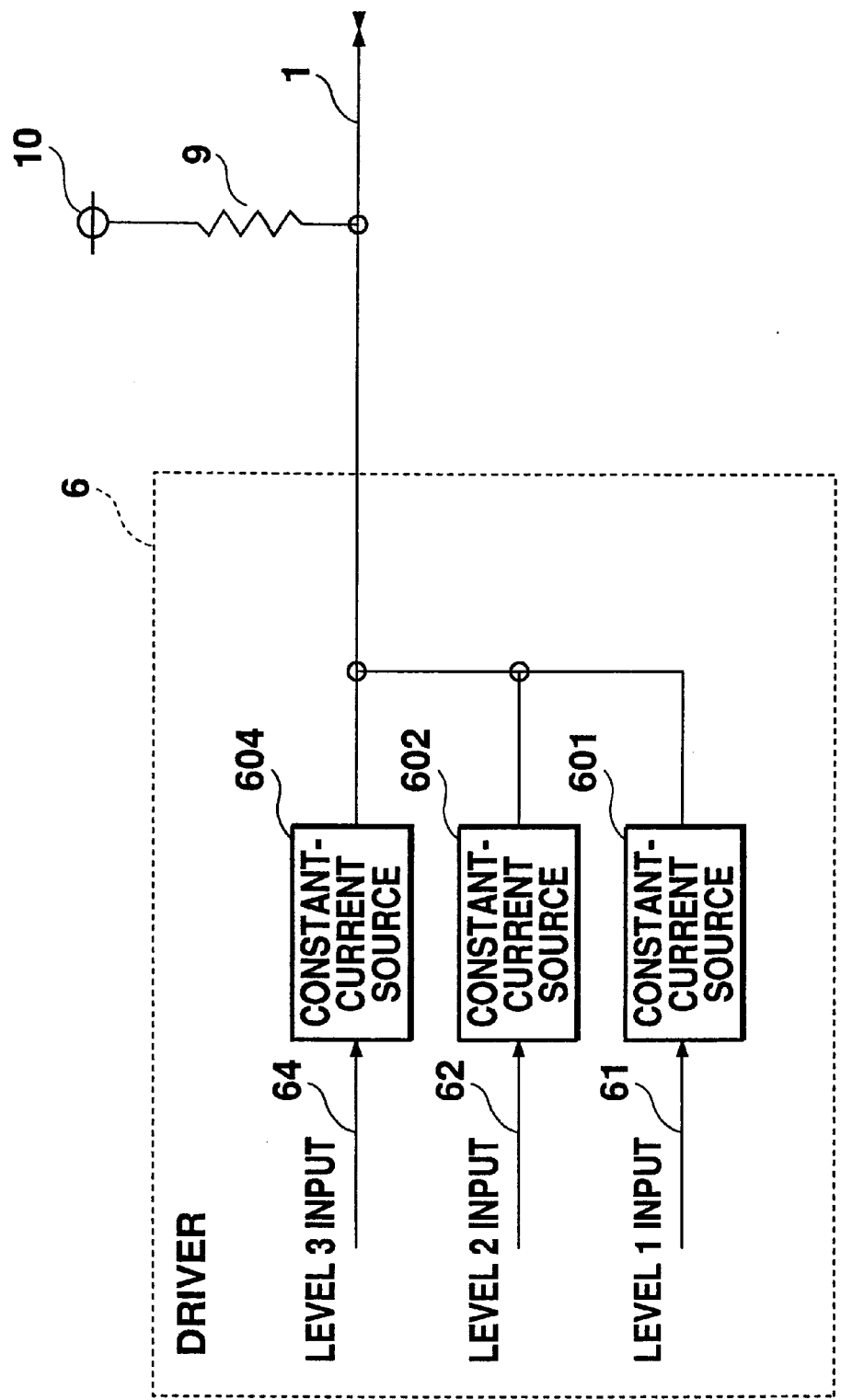
FIG. 3 is a schematic diagram of a driver shown in FIG. 2.

FIG. 3 is a schematic diagram of the driver 6 shown in FIG. 2. The analog output signal from the driver 6 is constituted in such a manner that voltage amplitudes to be transmitted to the other device 2 can be superimposed. To realize this, the driver 6 of electric current drive type is used as shown in FIG. 3. Constant-current sources 604, 602, 601 drive different currents in response to the input signals 64, 62, 61. When the bus level is represented by a natural number n=1, 2, 3,Ö and a reference voltage at the time of outputting signals to the outside is e, the binary logic signal is converted to a voltage with an amplitude of $e \cdot 2^{n-1}$ in accordance with the input signal. In the embodiment, the reference level (minimum unit) of the voltage to be transmitted to the bus 1 is 1V (e=1, n=1). The bus 1 is pulled up by a reference power supply 10 via a resistor 9, so that the voltage corresponding to the drive current of the driver 6 is generated in the bus 1. In the driver 6 of the embodiment, upon receipt of the logic signals 64, 62, 61 of levels 3, 2, 1, they are converted to voltages with amplitudes of $2^2$=4V, $2^1$=2V, $2^0$=1V by the constant-current sources 604, 602, 601, respectively. By superimposing the amplitudes of the converted voltages, a multi-value logic bus signal is generated. Specifically, the binary logic signal outputted from each function is represented in a binary value (0V and any one of 1V, 2V and 4V) even after being converted, but the bus signal is converted to the multi-value logic signal by superimposing the amplitudes of the converted voltages.

The operation of the first embodiment will next be described. First, data transmission operation will be described.

When the signals 41a, 41b, 41c are transmitted from the function 4a, 4b, 4c, the bus level selection circuit 5 transmits the corresponding signals 64, 62, 61 to the driver 6. In the conventional bus level selection circuit 5, since multiplex communication cannot be performed, data needs to be received/transferred in consideration of input/output timing. In the embodiment, however, routing may be performed without considering the timing. The driver 6 converts the input signal 64, 62, 61 to the analog signal of the voltage described later in accordance with the corresponding bus level. The operation will be described in more detail with reference to FIG. 4.

FIGS. 4(a)–4(c) are diagrams showing relationships in waveform pattern of the binary signals (logic signals) transmitted to the driver 6 and the multi-value logic (bus) signal generated by the driver 6.

Figure 4:
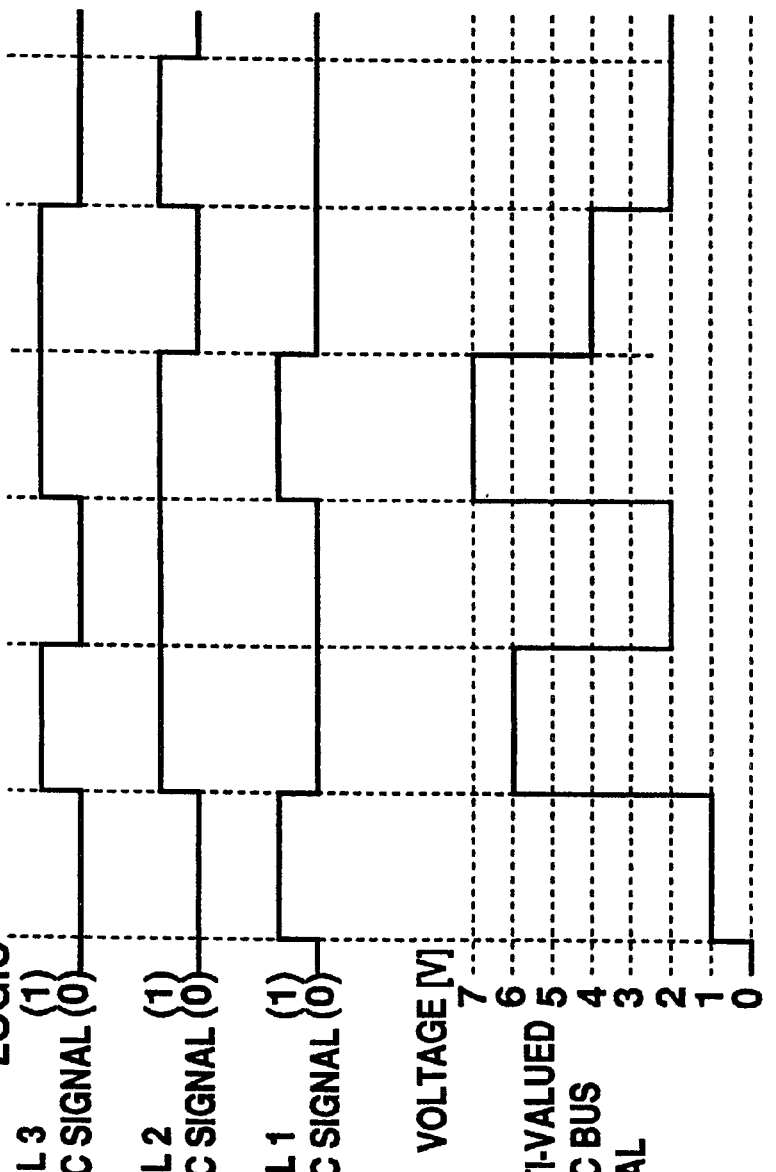
FIGS. 4(a)–4(c) are diagrams showing the relationship in waveform pattern of driver input signals and a bus signal or a receiver output signal in the first embodiment.

In FIG. 4, (a) to (c) show waveforms of the signals 64, 62, 61 of levels 3, 2, 1, respectively. Upon receipt of the logic signal corresponding to the level, the driver 6 converts the signal into a voltage having an amplitude corresponding to the level of the logic signal. In the driver 6 of the embodiment, when a plurality of binary logic signals are simultaneously received, the driver 6 superimposes converted analog signals corresponding to the bus levels of the logic signals to generate the multi-value logic signal.

Specifically, at 4(1), since only the signal 61 of level 1 is outputted at 1 (high level), the driver 6 converts the input signal 61 to an analog signal of the corresponding voltage 1V. At this time, the bus signal is outputted with a voltage of 1V as shown in FIG. 4(d). Additionally, the voltage based on the signal 61 of level 1 is 0V or 1V, but the voltage is represented as 0–1V for the sake of convenience. At 4(2), since the signal 64 of level 3 and the signal 62 of level 2 are outputted at 1 (high level), the driver 6 converts the input signals 64, 62 to analog signals of the corresponding voltages 4V and 2V, respectively. Therefore, the bus signal is outputted with a voltage of 6(=4+2)V which is obtained by superimposing the voltage amplitudes. At 4(4), since the signals 64, 62, 61 of all levels are outputted at 1 (high level), the driver 6 converts the input signals 64, 62, 61 to analog signals of the corresponding voltages 4V, 2V and 1V, respectively. At this time, the bus signal is outputted with a voltage of 7(=4+2+1)V which is obtained by superimposing all voltage amplitudes. The bus signal is thus generated by the driver 6 as the multi-value logic signal with the voltage amplitudes superimposed. In the data communication system of the embodiment, by dividing the voltage of the analog signal, multiplex communication is realized. In the embodiment, when the reference voltage is 1V, the multi-value logic bus signal is outputted by voltages of eight patterns from a minimum 0V to a maximum 7V.

As aforementioned, since the binary logic signals from the functions are converted to the analog signals, superimposed and simultaneously emitted, the bus width can be reduced. For example, when 15 bit data is to be transferred, in the conventional system which emits the binary logic signals as they are, 15 data signal conductors are necessary for the bus 1. In the embodiment, however, only five data signal conductors may be provided for the bus 1.

The operation when data is transmitted in the embodiment will now be described.

Contrary to the aforementioned case, the data transmitted to the device 2 via the bus 1 is a multi-value logic signal which is generated by superimposing voltage amplitudes. The receiver 7 decodes the multi-value logic signal, and distinguishes based on which bus level the multi-value logic signal is generated, which will be described hereinafter. Additionally, since the binary logic signals 74, 72, 71 which are obtained by encoding the multi-value logic signal received by the receiver 7 are the same as the binary logic signals (a) to (c) transmitted to the driver 6 shown in FIGS. 4(a)–4(d), the operation of the receiver 7 will be described with reference to FIGS. 4(a)–4(d).

The receiver 7 can basically perform the operation reverse to that of the driver 6. For example, the multi-value logic bus signal shown at 4(1) is transmitted from the bus 1, and its voltage is 1V. In this case, it can be seen that the multi-value logic bus signal includes only the signal of the minimum voltage level 1V. Therefore, the receiver 7 outputs only the signal 71 of level 1 corresponding to the voltage 1V as output 1 (high level) in response to the input signal. In this case, the output signal is naturally a logic signal binarized as shown in FIG. 4(c). Moreover, the signal shown at 4(2) is transmitted from the bus 1, and its voltage is 6V. In this case, it is seen that the multi-value logic bus signal is formed by superimposing analog signals of voltages 4V and 2V. Therefore, in response to the input signal, the receiver 7 outputs the signal 74 of level 3 and the signal 72 of level 2 as output 1 (high level). If the receiver 7 knows only the reference voltage e, it can decode eight patterns of multi-value logic bus signals to divide the signal into the signals 74, 72, 71 even when any voltage level of multi-value logic bus signal is transmitted. Additionally, the reference voltage $e_1$ used by the driver 6 is the same in value as the reference voltage $e_2$ used by the receiver 7.

As aforementioned, in each device 2 of the embodiment, the unique bus level is allocated to the binary logic signal outputted from the function, and the binary logic signal is converted to the analog signal of the voltage $e \cdot 2^{n-1}$ and transmitted. Since the multi-value logic signal can be generated by the driver 6, the bus width can be reduced. Even when a plurality of outputs are simultaneously emitted from the functions, the analog signals generated based on the binary logic signals have different amplitudes. Therefore, even if the analog signals are superimposed, the signal superimposition relationship can be distinguished on the side of reception. Between the devices A and B shown in FIG. 1, by allocating different bus levels 1, 2, 3 to three functions, respectively, three functions can perform data transfer simultaneously and in parallel. According to the embodiment, multiplex communication, which cannot be realized by the multi-value logic device using the conventional analog system, can be realized. Therefore, in addition to the reduction of bus width, the enhancement of throughput can be realized. In other words, there is provided a bus system which produces a high throughput without increasing the number of signal conductors or pins or CPU clock frequencies.

Additionally, in the above description, in order to set the reference voltage to 1V, e is set to 1. If the value of e is decreased, the power consumption is accordingly reduced, but the range of signal voltages is also reduced, which results in deterioration of data reliability. On the other hand, if the value of constant e is increased, the range of signal voltages is increased. Therefore, the data reliability is enhanced, but the power consumption is enlarged. The constant e may be appropriately determined by considering such trade-off.

Moreover, in general, both the driver 6 and the receiver 7 are provided in the device 2 as shown in the drawing to realize bi-directional communication, but the device may be used exclusively for transmission or reception by providing only one of the driver 6 and the receiver 7.

Furthermore, the structure of the embodiment can be regarded as a board and PCI bus in one information processor. However, the present invention is not limited to this structure. For example, by providing the multi-value logic device 2 on each information processor and using the bus 1 as a network, the structure of the present invention can also be applied to a network system to produce the same effect.

SECOND EMBODIMENT

Figure 5:
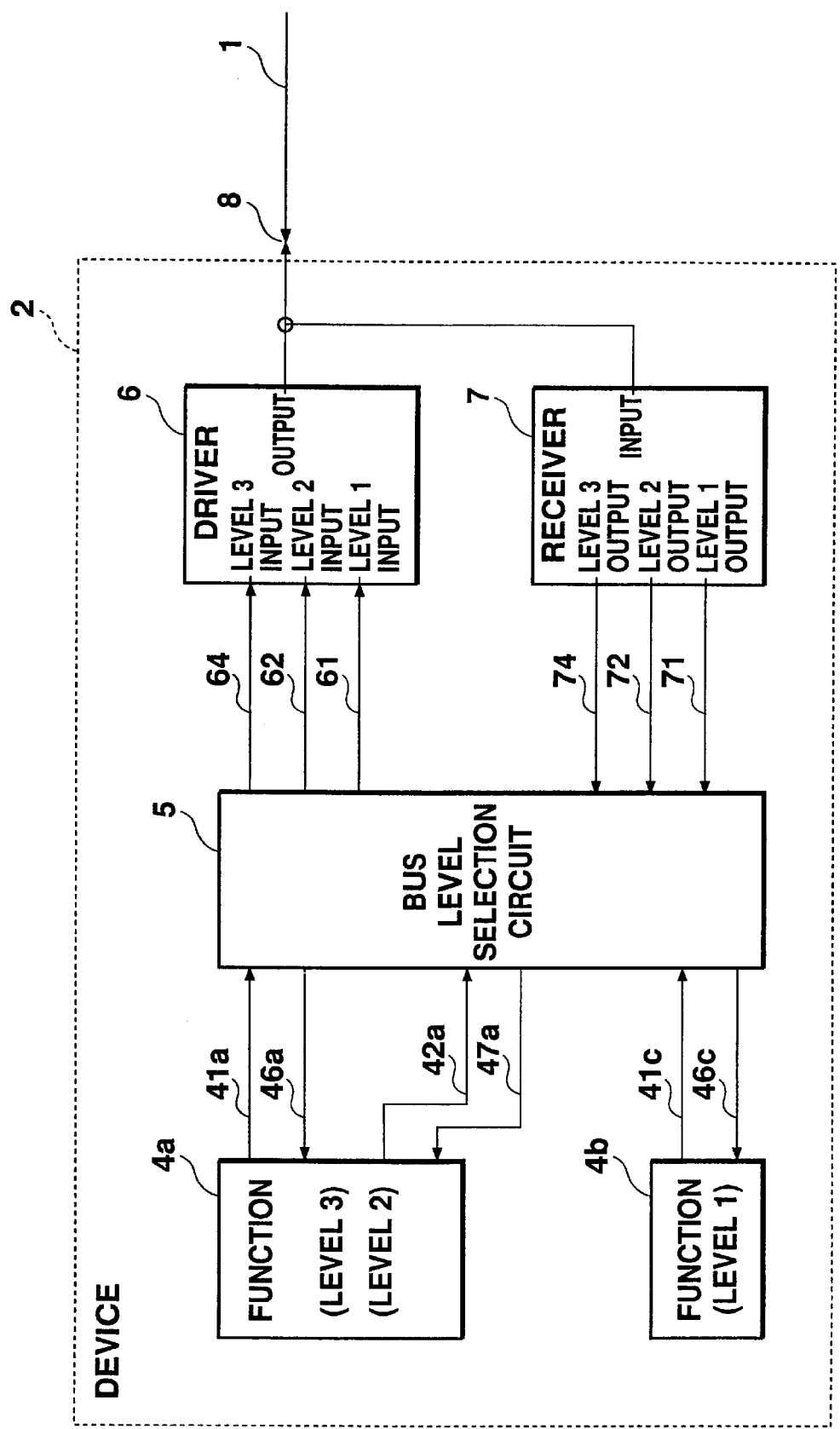
FIG. 5 is a block diagram showing the inside structure of a multi-value logic device according to a second embodiment of the present invention.

FIG. 5 is a block diagram showing the internal structure of a multi-value logic device according to the second embodiment of the present invention. Additionally, the same structure and signals as those of the first embodiment are denoted by the same reference characters, and the description thereof is omitted. The second embodiment is different from the first embodiment in that the function 4a has two binary logic signal conductors each constituted of a binary logic signal output line and a binary logic signal input line. Specifically, in the first embodiment, one bus level is allocated to one function, but in the second embodiment, a plurality of bus levels are allocated to the function 4a, so that data transfer can be performed with the other device 2.

As shown in FIG. 5, two levels 3 and 2 are allocated to the function 4a, but more bus levels may be allocated corresponding to the binary logic signal conductors. In the second embodiment, the bus level selection circuit 5 performs routing between the output signals 41a, 42a of the function 4a using levels 3, 2 and the input signals 64, 62 of the driver 6. Routing is also performed between the output signals 74, 72 of the receiver 7 and the input signals 46a, 47a of the function 4a using levels 3, 2. The bus level selection circuit 5 further performs routing between the output signal 41c of the function 4b using level 1 and the input signal 61 of the driver 6. Routing is further performed between the output signal 71 of the receiver 7 and the input signal 46c of the function 4b using level 1. The driver 6 and the receiver 7 perform the same operation as in the first embodiment irrespective of the structure of the binary logic signal conductor of the function.

As aforementioned, one function can use a plurality of input/output signals. For example, in a case of outputting data, the function 4a can simultaneously output the signals 41a, 42a to another function. Therefore, the throughput of data transfer can be enhanced. Additionally, the structure of the bus system using the multi-value logic device of the embodiment will be described later in another embodiment.

THIRD EMBODIMENT

In the third and subsequent embodiments, the structure of a bus system in which the aforementioned multi-value logic devices are connected via the shared bus 1 will be described.

In the bus system, it is apparent from the above description that multiplex communication can be realized by using different bus levels in sets of devices 2 performing data communication. It is also apparent that when the device 2 has a plurality of functions, multiplex communication can be realized by using different bus levels in sets of functions performing data communication. Furthermore, even when one function has a plurality of binary logic signal output lines like in the second embodiment, multiplex communication can be performed. Specifically, the embodiments of the present invention are characteristic in that the unique bus level is allocated to the output signal from the function and that each binary logic signal is converted to the analog signal having the unique voltage amplitude based on the bus level. Specifically, the unique bus level is allocated not to each device or each function, but to each output signal from the function, specifically, to each set of the binary logic signal output line of the function performing data communication and the binary logic signal input line of the other function. In this case, each set of signal conductors of each function which performs data communication is clarified even between one and one, one and multiple, or multiple and multiple devices. Therefore, even if data communications are simultaneously performed, communication end can be specified. Moreover, the use of the analog multi-value logic signal can realize the multiplex communication via the bus 1.

Figure 6:
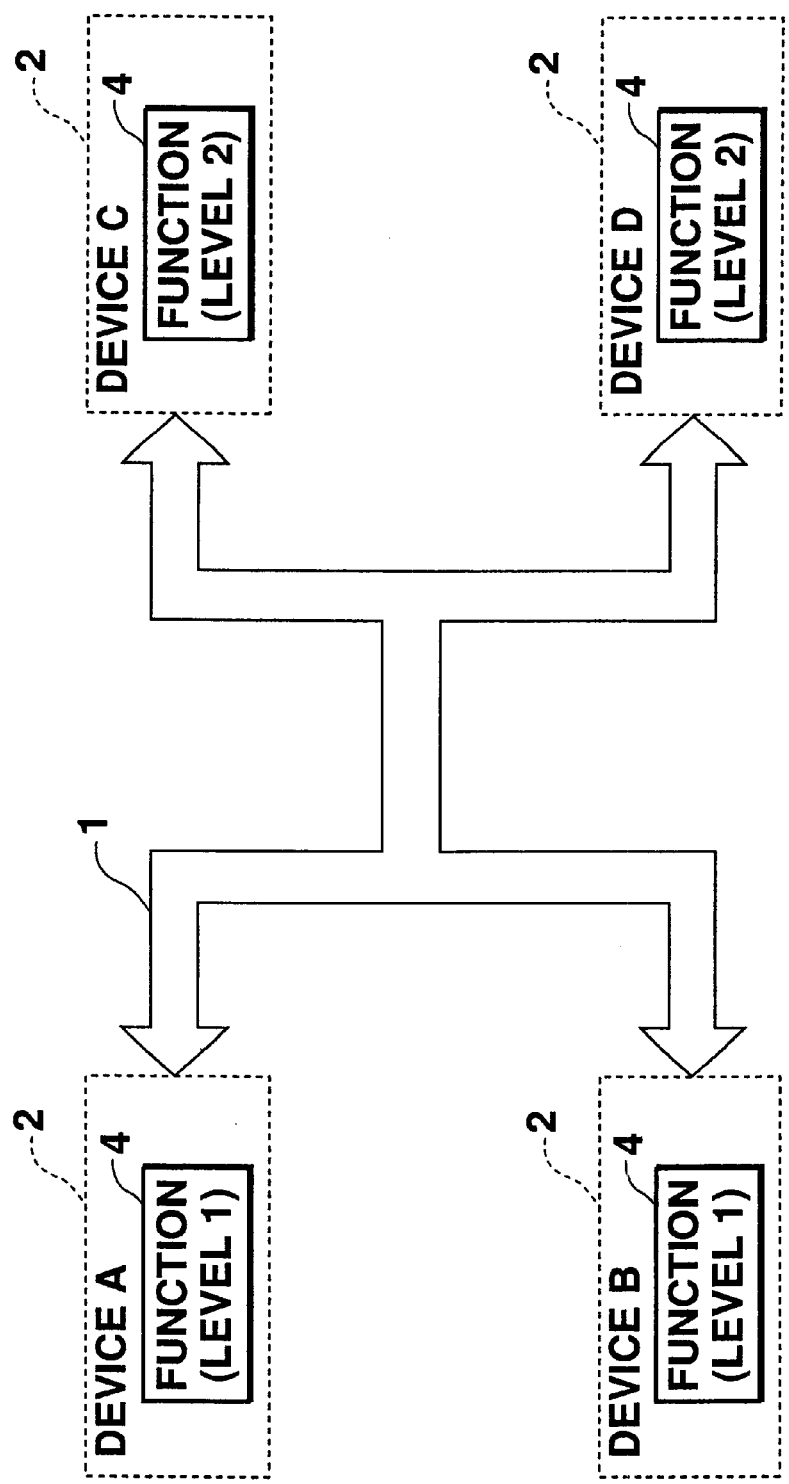
FIG. 6 is a diagram showing the overall structure of a bus system according to a third embodiment of the present invention.

FIG. 6 is a diagram showing the overall structure of a bus system according to the third embodiment of the present invention. In the bus system of the third embodiment, the devices 2, each of which has a single function using a single bus level, are connected via the shared bus 1. In the bus system, the functions of the devices A and B use level 1, while the functions of the devices C and D use level 2. For example, the bus signal outputted from the device A is converted to a voltage of 0–1V, and received by the device B loaded with the function using the same level 1. Specifically, data transfer is performed using the voltage of 0–1V between the functions of the devices A and B. Similarly, data transfer is performed using level 2 (0–2V) between the functions of the devices C and D. Additionally, the receiver of the device A encodes the signal of level 2 transmitted via the bus 1, but there is no data output signal conductor for outputting the binary logic signal. As a result, the device A does not receive the signal of level 2. Here, if communications between the devices A and B and between the devices C and D are simultaneously performed, the devices 2 can independently and simultaneously perform communication without interfering with one another because the voltages of different amplitudes 0–1V and 0–2V are superimposed. Therefore, since multiplex communication by a plurality of one-to-one device sets can be realized, throughput can be enhanced.

Additionally, in the third embodiment, the case where communication is performed using two bus levels in two one-to-one device sets has been illustrated, but by increasing the number of bus levels for use, simultaneous communication can be realized in the same number of one-to-one device sets as the number of bus levels for use.

FOURTH EMBODIMENT

Figure 7:
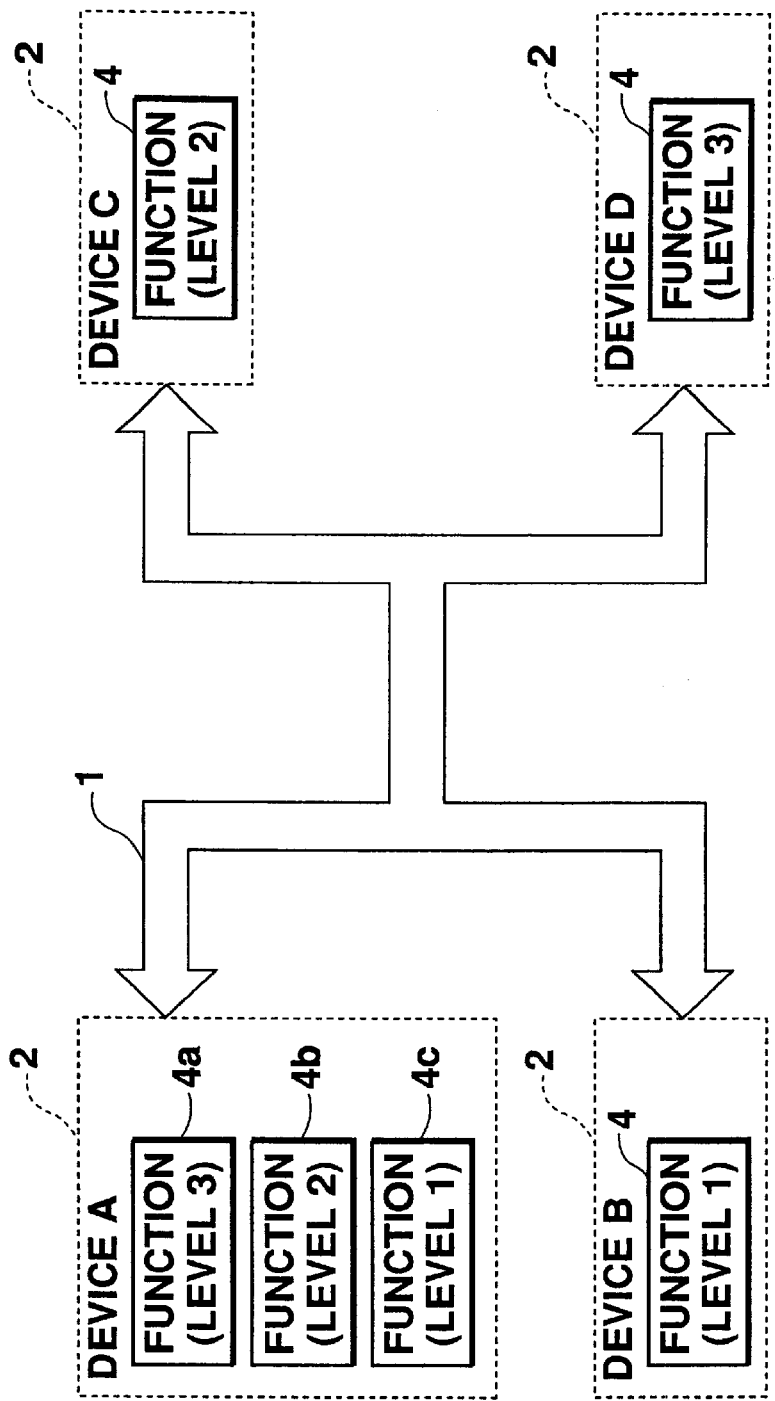
FIG. 7 is a diagram showing the overall structure of a bus system according to a fourth embodiment of the present invention.

FIG. 7 is a diagram showing the overall structure of a bus system according to the fourth embodiment of the present invention. In the bus system of the fourth embodiment, the device A which has three functions 4a, 4b, 4c each using a single bus level and the devices B, C, D each of which has a single function 4 using a single bus level are connected via the shared bus 1. In the structure, the function 4a of the device A and the device D perform data communication using bus level 3, the function 4b of the device A and the device C perform data communication using bus level 2, and the function 4c of the device A and the device B perform data communication using bus level 1. In the bus 1, the signals of the bus levels are superimposed without interfering with one another. For example, when the functions 4a, 4b, 4c of the device A are used as disc controllers while the devices B, C, D are used as discs, three discs can be accessed simultaneously Additionally, in the fourth embodiment, it is possible to realize the situation where simultaneous communication can be performed between one and three devices, but if n-bus levels are used for a device having n-functions, communication is performed with n-devices, i.e., simultaneous communication of one-to-multiple device set can be realized.

FIFTH EMBODIMENT

Figure 8:
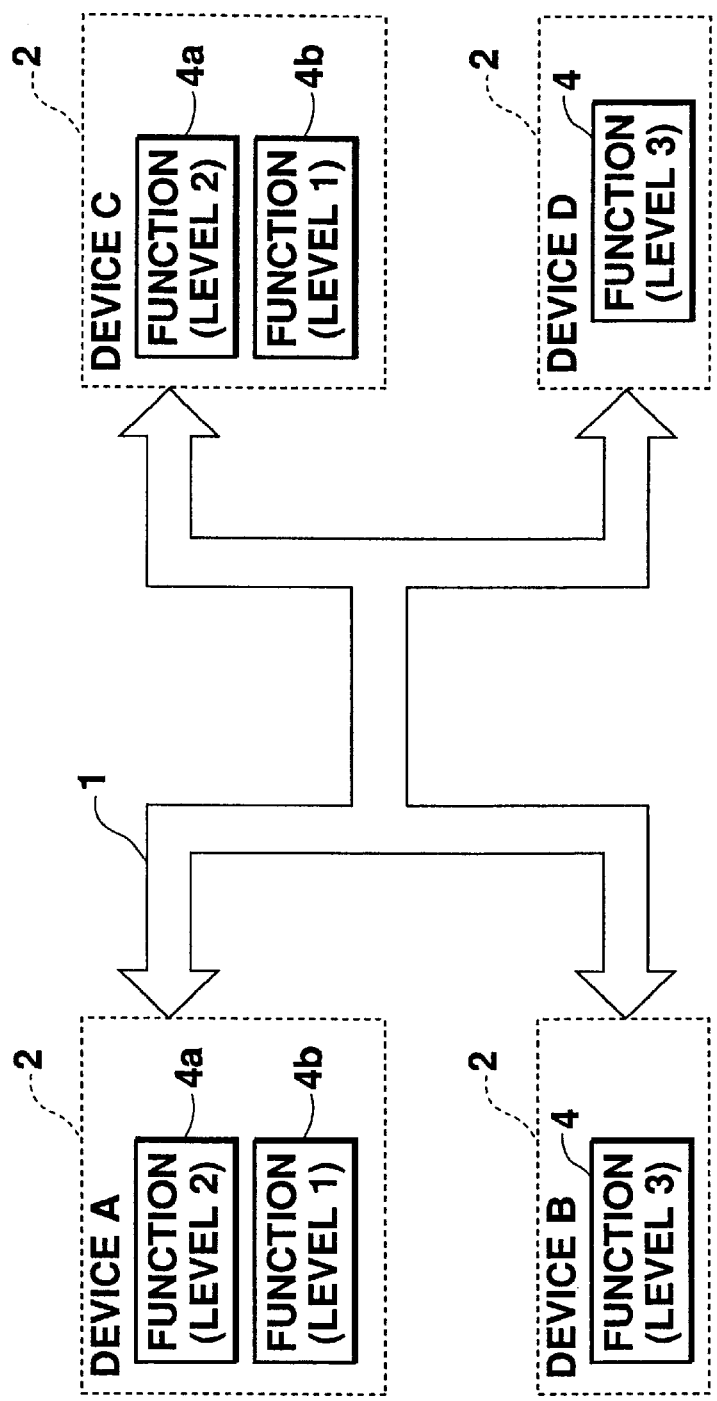
FIG. 8 is a diagram showing the whole structure of a bus system according to a fifth embodiment of the present invention.

FIG. 8 is a diagram showing the overall structure of a bus system according to the fifth embodiment of the present invention. In the bus system of the fifth embodiment, the devices A, C, each of which has two functions 4a and 4b each using a single bus level, and the devices B, D, each of which has a single function 4 using a single bus level, are connected via the shared bus 1. In the structure, the function 4a of the device A and the function 4a of the device C perform data communication using bus level 2, while the function 4b of the device A and the function 4b of the device C perform data communication using bus level 1. For example, when the communication using bus level 2 is used in the data transfer from the device A to the device C while the communication using bus level 1 is used in the data transfer from the device C to the device A, bi-directional simultaneous communication can be realized between two devices. For example, if the device A is used as a host computer, and the device C is used as a computer to which a plurality of disks are connected, reading to and writing from the discs connected to the device C can be performed simultaneously and in parallel. Moreover, both the devices can be used in data transfer in the same direction. In this case, the throughput of one-directional data transfer can be enhanced to about twice.

Additionally, in the fifth embodiment, the case where each of the devices A, C has two functions each using a single bus level has been illustrated, but by using n-bus levels for the devices having n-functions, n-simultaneous communications can be realized.

SIXTH EMBODIMENT

Figure 9:
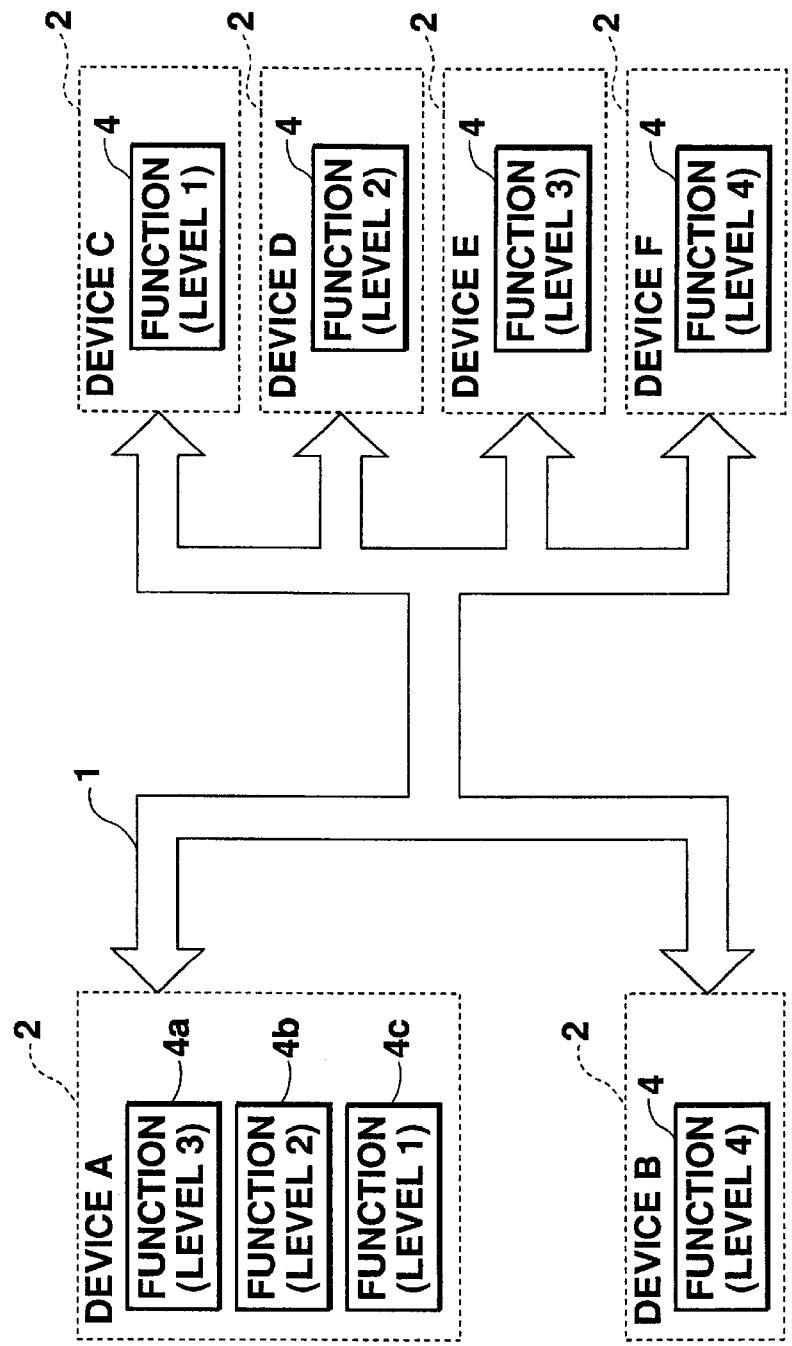
FIG. 9 is a diagram showing the overall structure of a bus system according to a sixth embodiment of the present invention.

FIG. 9 is a diagram showing the overall structure of a bus system according to the sixth embodiment of the present invention. The bus system of the sixth embodiment corresponds to a combination of the bus systems of the third and fourth embodiments. In the bus system of the sixth embodiment, the device A which has three functions 4a, 4b, 4c, each using a single bus level, and the devices B, C, D, E, F, each of which has a single function 4 using a single bus level, are connected via the shared bus 1. In the structure, the function 4a of the device A and the device E perform data communication using bus level 3, the function 4b of the device A and the device D perform data communication using bus level 2, and the function 4c of the device A and the device C perform data communication using bus level 1. The functions 4 of the devices B, F perform data communication using level 4. In the structure, the data communications between the device A and the devices E, D, C and between the devices B and F can be performed simultaneously and in parallel. As aforementioned, according to the sixth embodiment, the simultaneous communication between multiple-to-multiple devices can be realized in which the one-to-multiple and one-to-one device communications are combined. Therefore, the throughput of data transfer in the all of system can further be enhanced.

Additionally, in the sixth embodiment, the case where the simultaneous communication of one-to-three and one-to-one devices is performed has been illustrated, but by using n-bus levels, n-sets of data communications can be simultaneously performed.

SEVENTH EMBODIMENT

Figure 10:
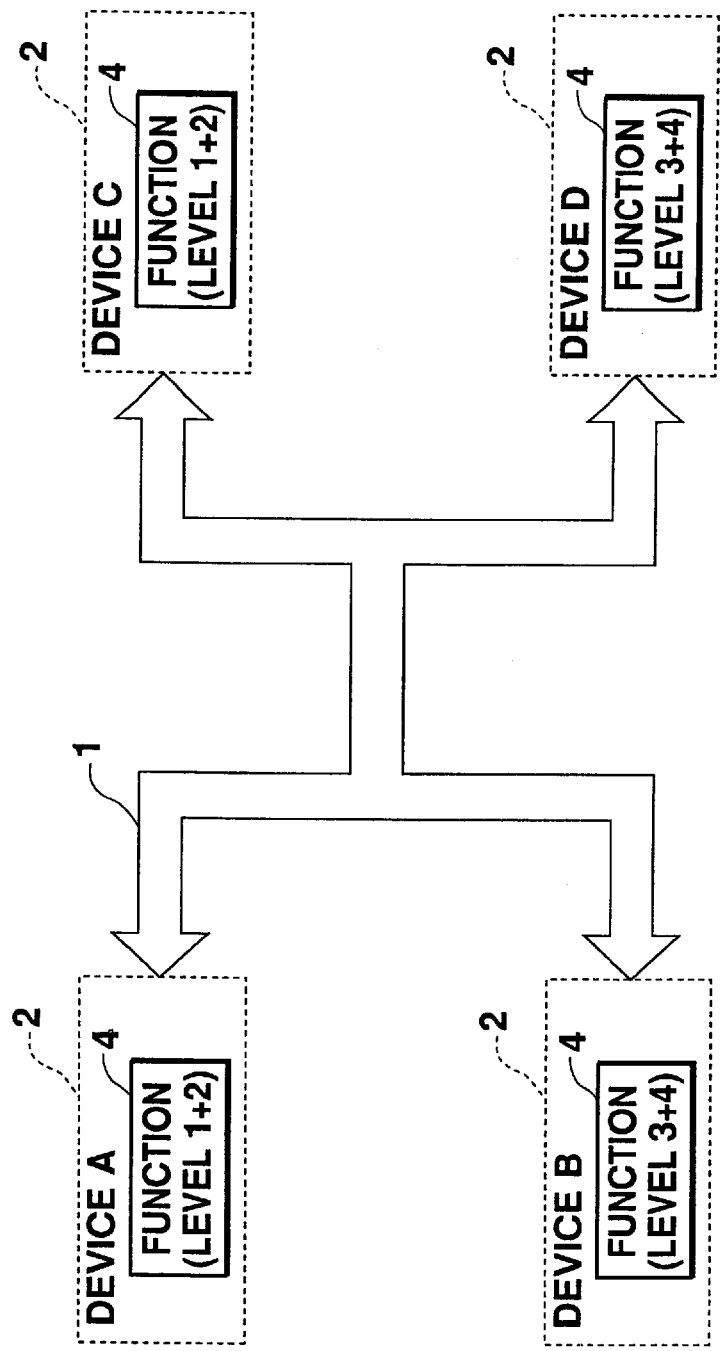
FIG. 10 is a diagram showing the overall structure of a bus system according to a seventh embodiment of the present invention.
Figure 11:
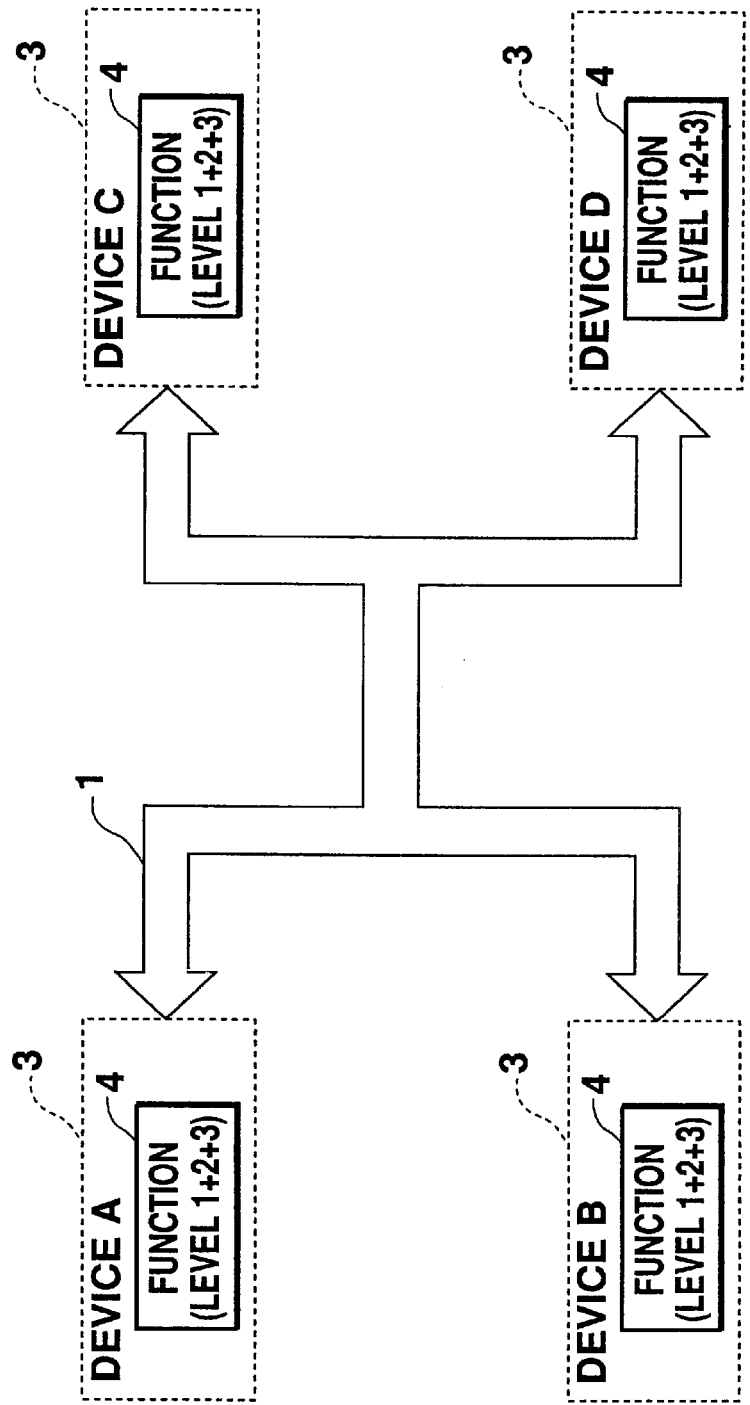
FIG. 11 is a diagram showing the overall structure of a conventional bus system.

FIG. 10 is a diagram showing the overall structure of a bus system according to the seventh embodiment of the present invention. In the bus system of the seventh embodiment, the devices A, B, C, D, each of which has a single function 4 using a plurality of bus levels as shown in the second embodiment, are connected via the shared bus 1. In the structure, the devices A and C perform data communication using bus levels 1, 2, while the devices B and D perform data communication using bus levels 3, 4. According to the seventh embodiment, bi-directional simultaneous communications of a plurality of one-to-one device sets can be realized.

In the above embodiments, various bus system structures have been described, but a bus system may be constructed by optionally combining the structures. Moreover, as aforementioned, in the bus systems shown in FIGS. 6 to 10, if the device 2 is regarded as the information processor with the multi-value logic device mounted thereon while the bus 1 is regarded as the network, the structure of the present invention can also be applied to the network system, which can provide effects similar to those of the bus systems shown in the third to seventh embodiments.

What is claimed is:

1. A multi-value logic device comprising:
    at least one function for outputting a binary logic signal via a binary logic signal output line; and
    transmission control means having a data input signal conductor corresponding to each binary logic signal output line and, when a bus level uniquely allocated to said data input signal conductor to which the binary logic signal from said function is inputted is n (n being a natural number), and a reference voltage at the time of signal output is e, converting the binary logic signal to an analog signal with a voltage of $e \cdot 2^{n-1}$ and transmitting the signal,
    said transmission control means superimposing analog signals, when a plurality of binary logic signals are simultaneously inputted, and transmitting data as a multi-value logic signal.

2. The multi-value logic device according to claim 1, further comprising an output signal selection circuit for dynamically establishing a correspondence between the binary logic signal output line of said function and the data input signal conductor of said transmission control means.

3. The multi-value logic device according to claim 1 wherein said at least one function has a plurality of said binary logic signal output lines.

4. The multi-value logic device according to claim 1 wherein said transmission control means includes constant-current sources for supplying different currents corresponding to said data input signal conductors.

5. A multi-value logic device comprising:

at least one function for receiving a binary logic signal via a binary logic signal input line; and reception control means having a data output signal conductor corresponding to each binary logic signal input line, having a unique bus level n (n being a natural number) allocated to each data output signal conductor, and converting a received analog multi-value logic signal to at least one binary logic signal and transmitting the converted binary logic signal to said function via said data output signal conductor, said reception control means, when a reference voltage upon receiving the multi-value logic signal is e, decoding a superimposed voltage of $e \cdot 2^{n-1}$ constituting the received analog multi-value logic signal to distinguish a bus level for generation of the voltage, and transmitting the binary logic signal via said data output signal conductor corresponding to each bus level.

6. The multi-value logic device according to claim 5, further comprising an input signal selection circuit for dynamically establishing a correspondence between the binary logic signal input line of said function and the data output signal conductor of said reception control means.

7. The multi-value logic device according to claim 5 wherein said at least one function has a plurality of said binary logic signal input lines.

8. A multi-value logic device comprising:

at least one function having at least one binary logic signal conductor including a binary logic signal output line for outputting a binary logic signal and a binary logic signal input line for receiving a binary logic signal and having a unique bus level allocated to each binary logic signal conductor;

transmission control means having a data input signal conductor corresponding to each binary logic signal output line and, when the bus level of said binary logic signal output line via which the binary logic signal is outputted is n (n being a natural number) and a reference voltage upon signal output is $e_1$, converting the binary logic signal to an analog signal with a voltage of $e_1 \cdot 2^{n-1}$ and transmitting the signal; and reception control means having a data output signal conductor corresponding to each binary logic signal input line, and converting a received analog multi-value logic signal to at least one binary logic signal and transmitting the converted binary logic signal to said function via the data output signal conductor, said transmission control means superimposing analog signals, when a plurality of binary logic signals are simultaneously inputted, and transmitting data as the multi-value logic signal, and said reception control means, when a reference voltage upon receiving the multi-value logic signal is $e_2$, decoding a superimposed voltage of $e_2 \cdot 2^{n-1}$ constituting the received analog multi-value logic signal to distinguish a bus level for generation of the voltage, and transmitting the binary logic signal to the binary logic signal input line of said function corresponding to each bus level.

9. The multi-value logic device according to claim 8 further comprising an input/output signal selection circuit for dynamically establishing a correspondence between the binary logic signal output line of said function and the data input signal conductor of said transmission control means and between the binary logic signal input line of said function and the data output signal conductor of said reception control means.

10. A bus system comprising:

a plurality of multi-value logic devices; and a shared bus connecting said multi-value logic devices, each of said multi-value logic devices comprising:

at least one function having at least one binary logic signal conductor including a binary logic signal output line for outputting a binary logic signal and a binary logic signal input line for receiving a binary logic signal and having a unique bus level allocated to each binary logic signal conductor;

transmission control means having a data input signal conductor corresponding to each binary logic signal output line and, when the bus level of said binary logic signal output line via which the binary logic signal is outputted is n (n being a natural number) and a reference voltage upon signal output is $e_1$, converting the binary logic signal to an analog signal with a voltage of $e_1 \cdot 2^{n-1}$ and transmitting the signal; and reception control means having a data output signal conductor corresponding to each binary logic signal input line, and converting a received analog multi-value logic signal to at least one binary logic signal and transmitting the converted binary logic signal to said function via the data output signal conductor, said transmission control means superimposing analog signals, when a plurality of binary logic signals are simultaneously inputted, and transmitting data as the multi-value logic signal, said reception control means, when a reference voltage upon receiving the multi-value logic signal is $e_2$, decoding a superimposed voltage of $e_2 \cdot 2^{n-1}$ constituting the received analog multi-value logic signal to distinguish a bus level for generation of the voltage, and transmitting the binary logic signal to the binary logic signal input line of said function corresponding to each bus level, and a bus level which does not overlap a bus level of said binary logic signal conductor for use in another data communication being allocated to each binary logic signal conductor of said multi-value logic devices for use in data communication, so that multiplex communication between the multi-value logic devices is realized.

11. The bus system according to claim 10 wherein at least one of said multi-value logic devices has a plurality of said functions, and simultaneous/parallel data communication can be performed between each function and functions of the other multi-value logic devices.

12. The bus system according to claim 10 wherein at least one of said multi-value logic devices performing data communication has a plurality of said functions, and simultaneous/parallel data communication can be performed between the plurality of functions.

13. The bus system according to claim 10 wherein at least one of said multi-value logic devices performing data communication has functions, each of which has a plurality of said binary logic signal conductors, and data communication can be performed between the functions simultaneously using the plurality of binary logic signal conductors.

14. A network system comprising:

a plurality of information processors, each information processor being provided with a multi-value logic device; and a shared network connecting said information processors, each of said multi-value logic devices of said information processors comprising:

at least one function having at least one binary logic signal conductor including a binary logic signal output line for outputting a binary logic signal and a binary logic signal input line for receiving a binary logic signal and having a unique bus level allocated to each binary logic signal conductor;

transmission control means having a data input signal conductor corresponding to each binary logic signal output line and, when the bus level of said binary logic signal output line via which the binary logic signal is outputted is n (n being a natural number) and a reference voltage upon signal output is $e_1$, converting the binary logic signal to an analog signal with a voltage of $e_1 \cdot 2^{n-1}$ and transmitting the signal; and reception control means having a data output signal conductor corresponding to each binary logic signal input line, and converting a received analog multi-value logic signal to at least one binary logic signal and transmitting the converted binary logic signal to said function via the data output signal conductor, said transmission control means superimposing analog signals, when a plurality of binary logic signals are simultaneously inputted, and transmitting data as the multi-value logic signal, said reception control means, when a reference voltage upon receiving the multi-value logic signal is $e_2$, decoding a superimposed voltage of $e_2 \cdot 2^{n-1}$ constituting the received analog multi-value logic signal to distinguish a bus level for generation of the voltage, and transmitting the binary logic signal to the binary logic signal input line of said function corresponding to each bus level, and a bus level which does not overlap a bus level of said binary logic signal conductor for use in another data communication being allocated to each binary logic signal conductor of said multi-value logic devices for use in data communication, so that multiplex communication between the multi-value logic devices is realized.

* * * * *